United States Patent
Hao et al.

(10) Patent No.: US 12,556,324 B2
(45) Date of Patent: Feb. 17, 2026

(54) PHYSICAL UPLINK SHARED CHANNEL WITH SWITCHED ANTENNA AND FREQUENCY HOPPING

(71) Applicant: QUALCOMM Incorporated, San Diego, CA (US)

(72) Inventors: Chenxi Hao, Beijing (CN); Chao Wei, Beijing (CN); Yi Huang, San Diego, CA (US); Hao Xu, Beijing (CN); Min Huang, Beijing (CN); Qiaoyu Li, Beijing (CN); Jing Dai, Beijing (CN); Wei Xi, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 18/014,587

(22) PCT Filed: Aug. 14, 2020

(86) PCT No.: PCT/CN2020/109251
§ 371 (c)(1),
(2) Date: Jan. 5, 2023

(87) PCT Pub. No.: WO2022/032651
PCT Pub. Date: Feb. 17, 2022

(65) Prior Publication Data
US 2023/0318759 A1    Oct. 5, 2023

(51) Int. Cl.
*H04L 5/00* (2006.01)
*H04W 72/0453* (2023.01)

(52) U.S. Cl.
CPC .......... *H04L 5/0012* (2013.01); *H04L 5/0044* (2013.01); *H04W 72/0453* (2013.01); *H04L 5/0051* (2013.01)

(58) Field of Classification Search
None
See application file for complete search history.

(56) References Cited

U.S. PATENT DOCUMENTS

| | | |
|---|---|---|
| 2014/0185560 A1 | 7/2014 | Kim et al. |
| 2018/0368083 A1 | 12/2018 | Yang et al. |

(Continued)

FOREIGN PATENT DOCUMENTS

| | | |
|---|---|---|
| CN | 108668368 A | 10/2018 |
| CN | 110324123 A | 10/2019 |

(Continued)

OTHER PUBLICATIONS

Huawei, et al., "Draft CR on Frequency Hopping for PUSCH Transmission Scheduled by RAR UL Grant", 3GPP TSG RAN WG1 Meeting #95, R1-1814343, Spokane, USA, 20181112-20181116, 3 Pages, Nov. 16, 2018 (Nov. 16, 2018) the whole document.

(Continued)

*Primary Examiner* — Jay L Vogel
(74) *Attorney, Agent, or Firm* — Paul M. McAdams; Polsinelli

(57) ABSTRACT

Aspects of the present disclosure provide techniques for determining frequency hopping for physical uplink shared channel (PUSCH) repetitions sent using multiple frequency domain resource allocations (FDRAs). According to certain aspects, a user equipment (UE) determines at least first and second part frequency domain resource allocations (FDRAs) for a first physical uplink shared channel (PUSCH) transmission occasion, transmits a transport block (TB) via at least first and second parts of a physical uplink shared channel (PUSCH) on the first and second part FDRAs with (Continued)

first and second precoders during the first PUSCH transmission occasion, determines at least first and second part FDRAs for a second PUSCH transmission occasion based on a frequency hopping scheme, and transmits the same TB via first and second parts of the PUSCH on the determined first and second part FDRAs with first and second precoders during the second PUSCH transmission occasion.

22 Claims, 11 Drawing Sheets

(56) References Cited

U.S. PATENT DOCUMENTS

| 2019/0124675 | A1 | 4/2019 | Gao et al. | |
|---|---|---|---|---|
| 2019/0306841 | A1 | 10/2019 | Huang et al. | |
| 2020/0119783 | A1 | 4/2020 | Liu et al. | |
| 2020/0204407 | A1* | 6/2020 | Liu | H04L 27/2607 |
| 2021/0160913 | A1 | 5/2021 | Jiang et al. | |
| 2022/0295472 | A1 | 9/2022 | Matsumura et al. | |
| 2023/0093299 | A1 | 3/2023 | Yoshimura et al. | |
| 2023/0217429 | A1 | 7/2023 | Faxér et al. | |
| 2023/0276414 | A1 | 8/2023 | Hao et al. | |
| 2023/0300891 | A1* | 9/2023 | Su | H04L 5/0048 370/329 |
| 2023/0379923 | A1 | 11/2023 | Rastegardoost et al. | |

FOREIGN PATENT DOCUMENTS

| CN | 110890947 A | 3/2020 | |
|---|---|---|---|
| CN | 111294177 A | 6/2020 | |
| CN | 111447043 A | 7/2020 | |
| WO | WO-2018174522 A1 * | 9/2018 | ........... H04L 5/0053 |
| WO | 2019098935 A1 | 5/2019 | |
| WO | WO-2020067967 A1 * | 4/2020 | ........... H04L 5/0012 |
| WO | WO-2020221335 A1 * | 11/2020 | ........... H04W 72/542 |
| WO | WO-2021163899 A1 * | 8/2021 | ........... H04W 72/54 |

OTHER PUBLICATIONS

International Search Report and Written Opinion—PCT/CN2020/109251—ISA/EPO—May 14, 2021.

Ericsson: "Outcome of Email Thread [100e-NR-unlic-NRU-ULSignalsChannels-01]", 3GPP TSG-RAN WG1 Meeting #100-e, R1-2001308, e-Meeting, 20200224-20200306, pp. 1-16, Mar. 6, 2020 (Jun. 3, 2020) the whole document.

* cited by examiner

700 

702

DETERMINE AT LEAST FIRST AND SECOND PART FREQUENCY DOMAIN RESOURCE ALLOCATIONS (FDRAS) FOR A FIRST PHYSICAL UPLINK SHARED CHANNEL (PUSCH) TRANSMISSION OCCASION

704

TRANSMIT A TRANSPORT BLOCK (TB) VIA AT LEAST FIRST AND SECOND PARTS OF A PHYSICAL UPLINK SHARED CHANNEL (PUSCH) ON THE FIRST AND SECOND PART FDRAS WITH FIRST AND SECOND PRECODERS DURING THE FIRST PUSCH TRANSMISSION OCCASION

706

DETERMINE AT LEAST FIRST AND SECOND PART FDRAS FOR A SECOND PUSCH TRANSMISSION OCCASION BASED ON A FREQUENCY HOPPING SCHEME

708

TRANSMIT THE SAME TB VIA FIRST AND SECOND PARTS OF THE PUSCH ON THE DETERMINED FIRST AND SECOND PART FDRAS WITH FIRST AND SECOND PRECODERS DURING THE SECOND PUSCH TRANSMISSION OCCASION

FIG. 7

PHYSICAL UPLINK SHARED CHANNEL WITH SWITCHED ANTENNA AND FREQUENCY HOPPING

CROSS REFERENCE TO RELATED APPLICATIONS

This application is a National Stage Application filed under 35 U.S.C § 371 of PCT International Application No. PCT/CN2020/109251, entitled "PHYSICAL UPLINK SHARED CHANNEL WITH SWITCHED ANTENNA AND FREQUENCY HOPPING" filed Aug. 14, 2020, which is incorporated herein by reference in its entirety.

FIELD OF THE DISCLOSURE

Aspects of the present disclosure relate to wireless communications, and more particularly, to techniques for determining frequency hopping for PUSCH transmissions sent using multiple frequency domain resource allocations (FDRAs).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless nodes to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes determining at least first and second part frequency domain resource allocations (FDRAs) for a first physical uplink shared channel (PUSCH) transmission occasion, transmitting a transport block (TB) via at least first and second parts of a physical uplink shared channel (PUSCH) on the first and second part FDRAs with first and second precoders during the first PUSCH transmission occasion, determining at least first and second part FDRAs for a second PUSCH transmission occasion based on a frequency hopping scheme, and transmitting the same TB via the first and second parts of the PUSCH on the determined first and second part FDRAs with the first and second precoders during the second PUSCH transmission occasion.

Certain aspects provide a method for wireless communications by a network entity. The method generally includes scheduling a user equipment (UE) to transmit a physical uplink shared channel (PUSCH) in a first PUSCH transmission occasion using at least a first part frequency domain resource allocation (FDRA) and a second part FDRA, processing a transport block (TB) sent via at least first and second parts of the PUSCH on the first and second part FDRAs with first and second precoders during the first PUSCH transmission occasion, determining at least first and second part FDRAs for a second PUSCH transmission occasion based on a frequency hopping scheme, and
   processing the same TB sent via the first and second parts of the PUSCH on the determined first and second part FDRAs with the first and second precoders during the second PUSCH transmission occasion.

Certain aspects provide a user equipment (UE). The UE generally includes means for determining at least first and second part frequency domain resource allocations (FDRAs) for a first physical uplink shared channel (PUSCH) transmission occasion, means for transmitting a transport block (TB) via at least first and second parts of a physical uplink shared channel (PUSCH) on the first and second part FDRAs with first and second precoders during the first PUSCH transmission occasion, means for determining at least first and second part FDRAs for a second PUSCH transmission occasion based on a frequency hopping scheme, and means for transmitting the same TB via the first and second parts of the PUSCH on the determined first and second part FDRAs with the first and second precoders during the second PUSCH transmission occasion.

Certain aspects provide a network entity. The network entity generally includes means for scheduling, via at least one antenna, a user equipment (UE) to transmit a physical uplink shared channel (PUSCH) in a first PUSCH transmission occasion using at least a first part frequency domain resource allocation (FDRA) and a second part FDRA, means for processing a transport block (TB) sent via at least first and second parts of the PUSCH on the first and second part FDRAs with first and second precoders during the first PUSCH transmission occasion, means for determining at least first and second part FDRAs for a second PUSCH transmission occasion based on a frequency hopping scheme, and means for processing the same TB sent via the first and second parts of the PUSCH on the determined first and second part FDRAs with the first and second precoders during the second PUSCH transmission occasion.

Certain aspects provide a user equipment (UE). The UE generally includes a processing system configured to determine at least first and second part frequency domain resource allocations (FDRAs) for a first physical uplink shared channel (PUSCH) transmission occasion and a transmitter configured to transmit a transport block (TB) via at least first and second parts of a physical uplink shared channel (PUSCH) on the first and second part FDRAs with first and second precoders during the first PUSCH transmission occasion, wherein: the processing system is further configured to determine at least first and second part FDRAs for a second PUSCH transmission occasion based on a frequency hopping scheme and the transmitter is further configured to transmit the same TB via the first and second parts of the PUSCH on the determined first and second part FDRAs with the first and second precoders during the second PUSCH transmission occasion.

Certain aspects provide a network entity. The network entity generally includes a processing system configured to schedule, via at least one antenna, a user equipment (UE) to transmit a physical uplink shared channel (PUSCH) in a first PUSCH transmission occasion using at least a first part frequency domain resource allocation (FDRA) and a second part FDRA, process a transport block (TB) sent via at least first and second parts of the PUSCH on the first and second part FDRAs with first and second precoders during the first PUSCH transmission occasion, determine at least first and second part FDRAs for a second PUSCH transmission occasion based on a frequency hopping scheme, and process the same TB sent via the first and second parts of the PUSCH on the determined first and second part FDRAs with the first and second precoders during the second PUSCH transmission occasion.

Certain aspects provide an apparatus for wireless communications. The apparatus generally includes a processing system configured to determine at least first and second part frequency domain resource allocations (FDRAs) for a first physical uplink shared channel (PUSCH) transmission occasion and an interface configured to output a transport block (TB) for transmission via at least first and second parts of a physical uplink shared channel (PUSCH) on the first and second part FDRAs with first and second precoders during the first PUSCH transmission occasion, wherein: the processing system is further configured to determine at least first and second part FDRAs for a second PUSCH transmission occasion based on a frequency hopping scheme and the interface is further configured to output the same TB for transmission via the first and second parts of the PUSCH on the determined first and second part FDRAs with the first and second precoders during the second PUSCH transmission occasion.

Certain aspects provide an apparatus for wireless communications. The apparatus generally includes a processing system configured to schedule a user equipment (UE) to transmit a physical uplink shared channel (PUSCH) in a first PUSCH transmission occasion using at least a first part frequency domain resource allocation (FDRA) and a second part FDRA, process a transport block (TB) sent via at least first and second parts of the PUSCH on the first and second part FDRAs with first and second precoders during the first PUSCH transmission occasion, determine at least first and second part FDRAs for a second PUSCH transmission occasion based on a frequency hopping scheme, and process the same TB sent via the first and second parts of the PUSCH on the determined first and second part FDRAs with the first and second precoders during the second PUSCH transmission occasion.

Certain aspects provide a computer-readable medium for wireless communications. The computer-readable medium generally includes codes executable to determine at least first and second part frequency domain resource allocations (FDRAs) for a first physical uplink shared channel (PUSCH) transmission occasion, output a transport block (TB) for transmission via at least first and second parts of a physical uplink shared channel (PUSCH) on the first and second part FDRAs with first and second precoders during the first PUSCH transmission occasion, determine at least first and second part FDRAs for a second PUSCH transmission occasion based on a frequency hopping scheme, and output the same TB for transmission via the first and second parts of the PUSCH on the determined first and second part FDRAs with the first and second precoders during the second PUSCH transmission occasion.

Certain aspects provide a computer-readable medium for wireless communications. The computer-readable medium generally includes codes executable to schedule a user equipment (UE) to transmit a physical uplink shared channel (PUSCH) in a first PUSCH transmission occasion using at least a first part frequency domain resource allocation (FDRA) and a second part FDRA, process a transport block (TB) sent via at least first and second parts of the PUSCH on the first and second part FDRAs with first and second precoders during the first PUSCH transmission occasion, determine at least first and second part FDRAs for a second PUSCH transmission occasion based on a frequency hopping scheme, and process the same TB sent via the first and second parts of the PUSCH on the determined first and second part FDRAs with the first and second precoders during the second PUSCH transmission occasion.

Certain aspects provide means for, apparatus, and/or computer readable medium having computer executable code stored thereon, for techniques described herein for processing multi-TRP transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates example operations that may be performed by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
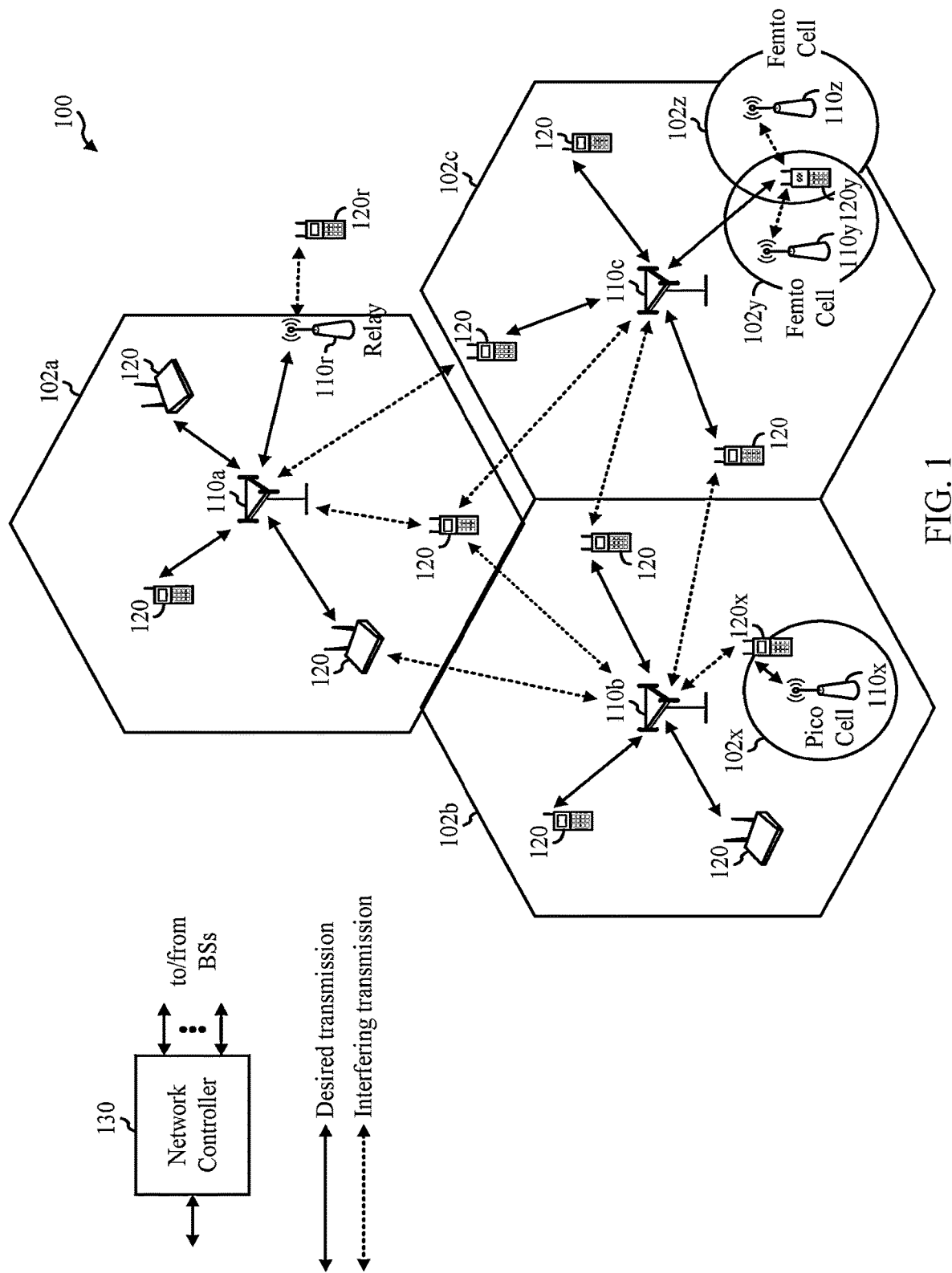
FIG. 1 is a block diagram conceptually illustrating an example telecommunications system, in accordance with certain aspects of the present disclosure.

Aspects of the present disclosure relate to wireless communications, and more particularly, to techniques for determining frequency hopping for physical uplink shared channel PUSCH transmissions sent using multiple frequency domain resource allocations (FDRAs).

The use of multiple FDRA parts and frequency hopping may help achieve frequency diversity for the PUSCH transmissions. The techniques presented herein may also enhance the performance for UEs at a cell-edge, for example, by allowing for full power transmission using relatively low cost power amplifiers (PAs).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 may be configured to perform operations 700 of FIG. 7 to transmit PUSCHs with frequency hopping using at least first and second FDRA parts, while BSs 110 may perform operations 800 of FIG. 8 to schedule and process PUSCH transmissions sent by a UE performing operations 700 of FIG. 7.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these B Ss. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity.

A wireless node may provide, for example, connectivity for or to a network (e.g., a wide area network such as Internet or a cellular network) via a wired or wireless communication link. Some UEs may be considered Internetof-Things (IoT) devices, which may be narrowband IoT (NB-IoT) devices. Also, the wireless node comprises a UE or a network entity such as a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
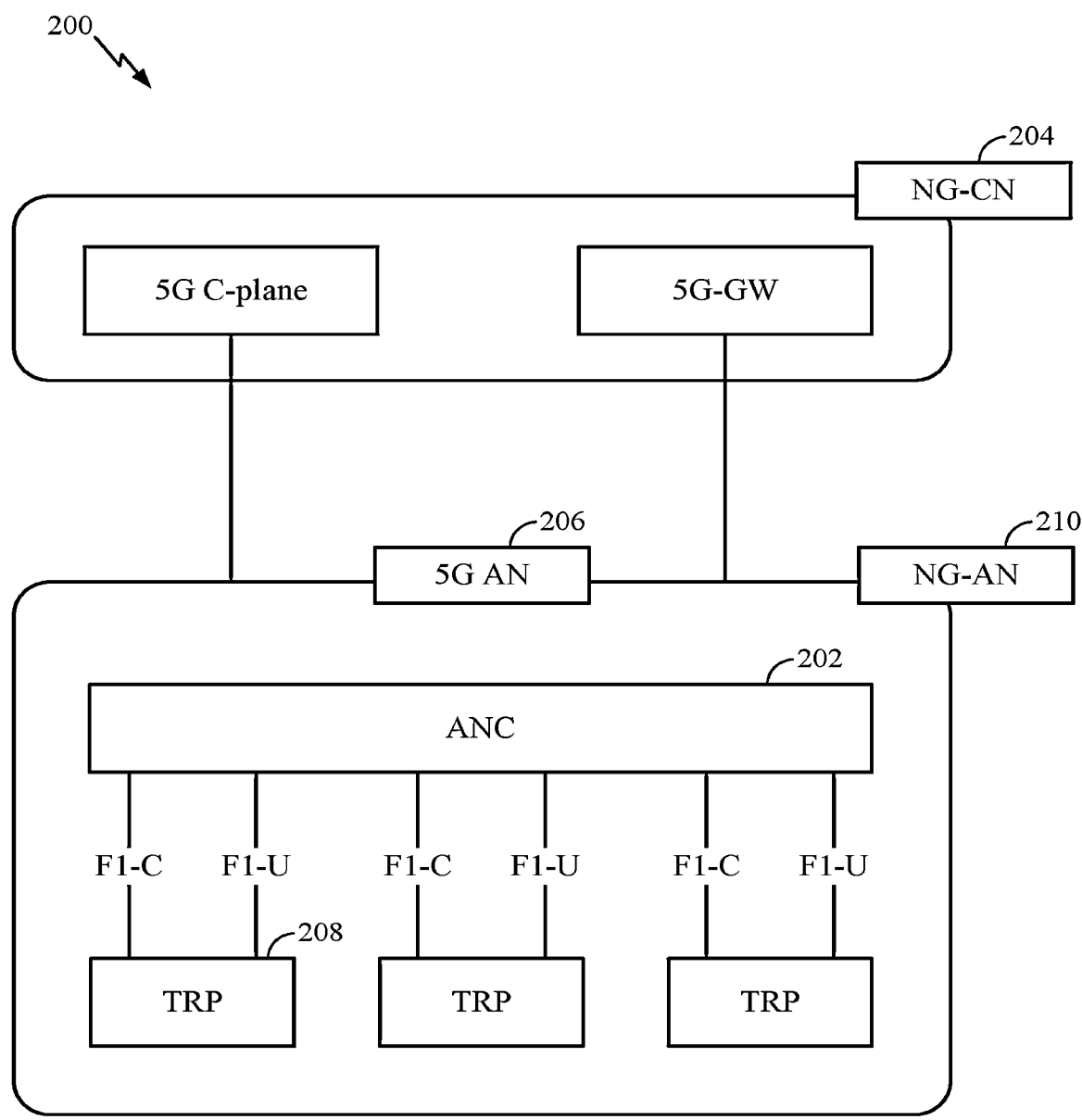
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
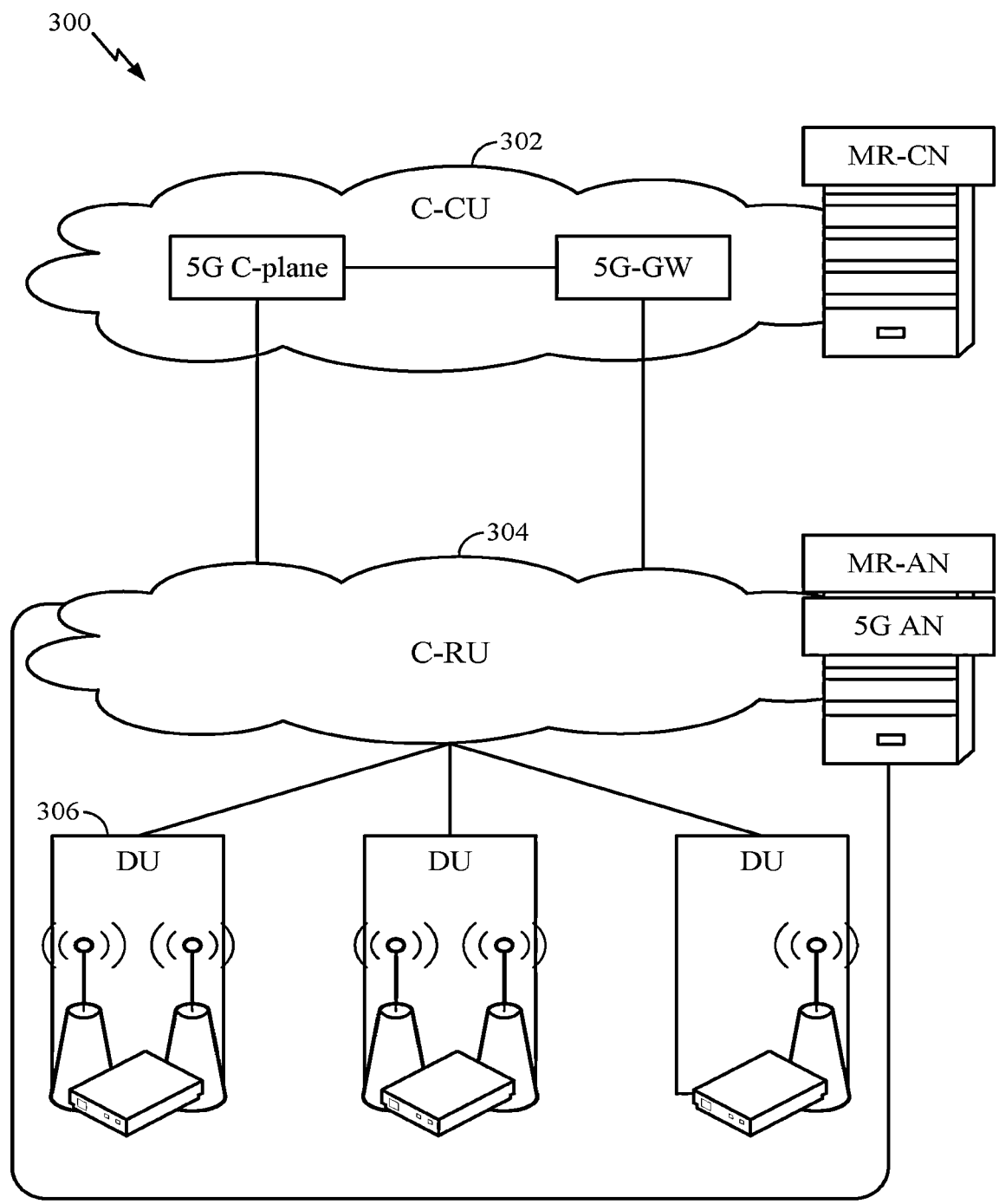
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
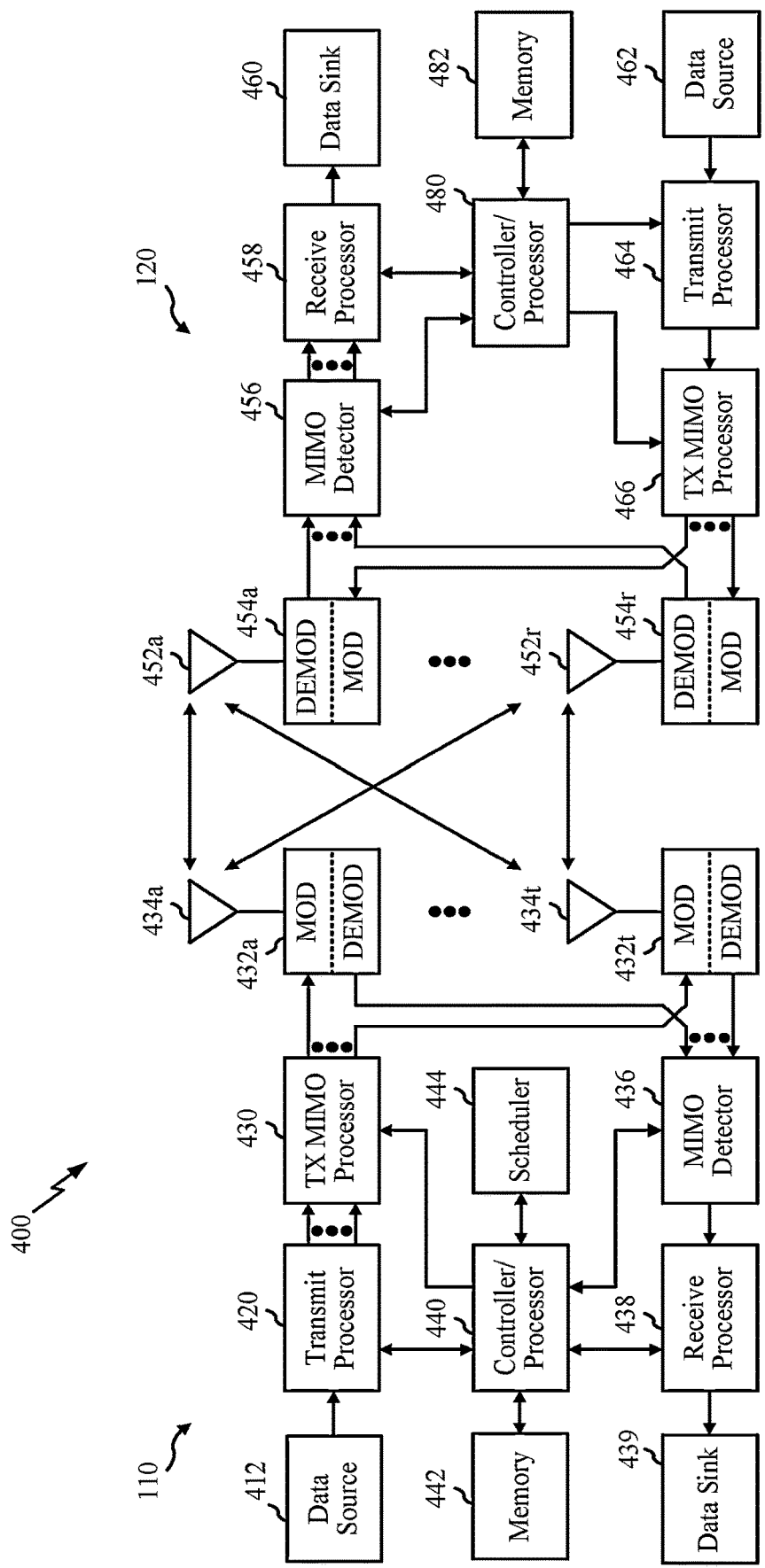
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may perform (or be used to perform) operations 700 of FIG. 7. Similarly, antennas 434, processors 420, 430, 438, and/or controller/processor 440 of the BS 110 may perform (or be used to perform) operations 800 of FIG. 8.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be define d with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
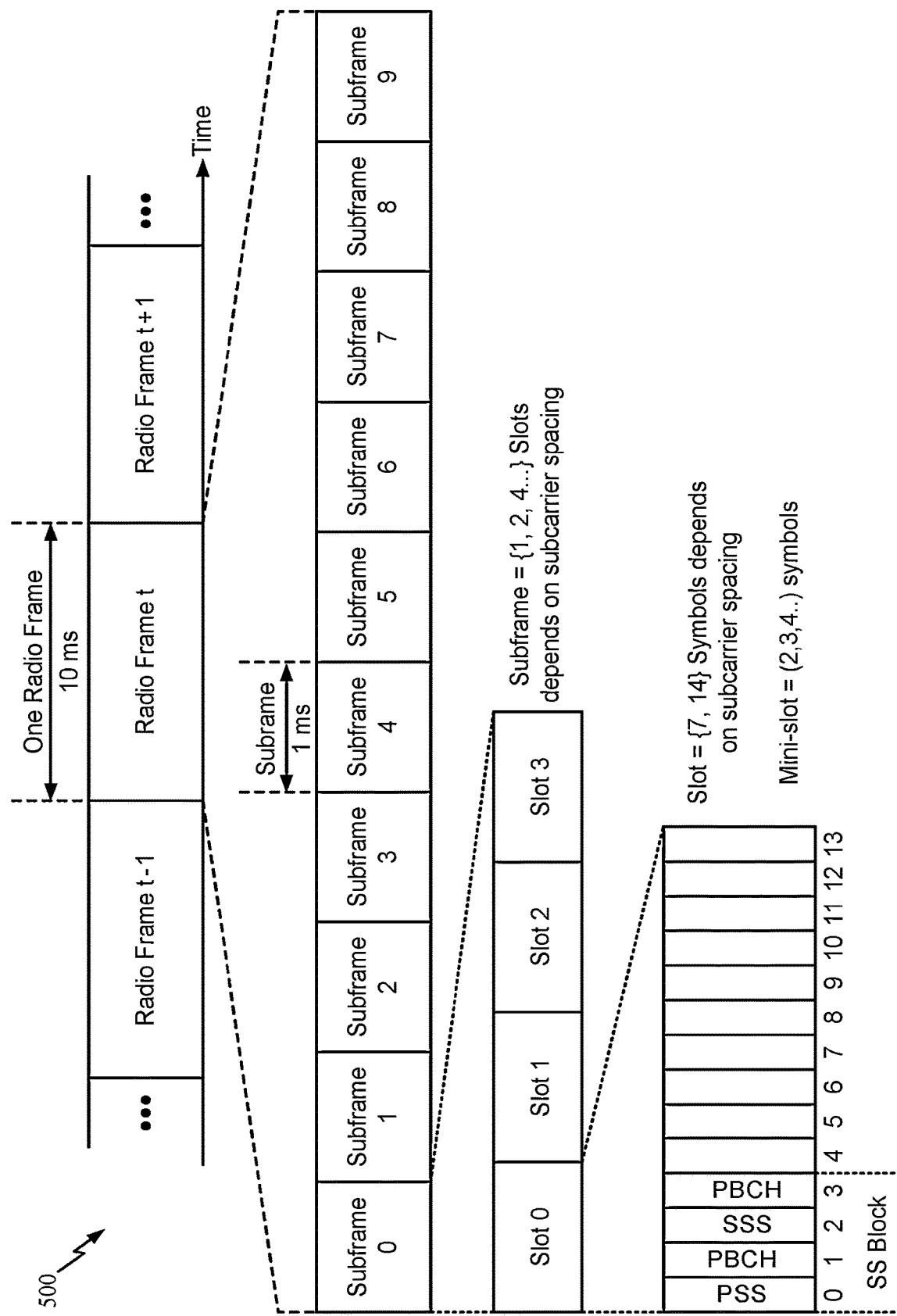
FIG. 5 is a diagram showing examples for implementing a communication protocol stack, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example PUSCH Transmissions with Switched Antenna Using Multiple FDRAs

Aspects of the present disclosure provide techniques for determining FDRA parts for a PUSCH sent using antenna switching. As will be described in greater detail below, at least two frequency domain resource allocation (FDRA) parts may be used to transmit a PUSCH using first and second precoders.

In current systems, there are two general modes for UL transmission: codebook based and non-codebook based. For codebook based transmission, the UE may signal its capability of whether it supports full coherent transmission, partial coherent transmission, and/or non-coherent transmission. For non-coherent UL transmission, the gNB can only configure (for each layer) a transmission precoder matrix indicator TPMI with a single Tx port, e.g., [1; 0] and [0; 1] for the UE to transmit PUSCH. For partial-coherent UL transmission, gNB can configure (for each layer) TPMI with a single Tx port, or TPMI with multiple ports that can be used coherently (e.g., [1; 0; 1; 0], [1; 0; j; 0], [0; 1; 0; −1]). For full coherent UL transmission, the gNB may freely configure any TPMI for PUSCH transmission (e.g., [1; 1; 1; 1]).

For partial coherent and non-coherent transmission, the UE may not be able to transmit at a high power class, as power amplifiers (PAs) may not be used jointly. For example, if a UE has two relatively low cost 23 dBm PAs, it may only be able to use one at a time, resulting in a maximum transmission power of 23 dBm. Thus, this limits UE performance at the cell-edge, as transmission power is a valuable resource to the performance.

For a dynamic grant, the TPMI is conveyed by the DCI. For configured grant (CG) type1, the TPMI is configured by RRC. Once configured, the UE transmits PUSCH periodically (using the RRC configured TPMI). For CG type2, the TPMI is indicated by DCI and, after receiving the DCI, the UE transmits PUSCH periodically (using the DCI indicated TPMI). VoIP service may be provided via a configured grant and transmitted periodically require to achieve 13.2 kbps transmission in 20 ms (which may correspond to 328 bits in one UL slot considering TDD system).

In order to enable full power transmission, certain systems (e.g., NR Rel. 16) allow a gNB to configure a UE supporting non-coherent and partial-coherent transmission with a full coherent precoder (e.g., [1; x]). In such cases, the UE may perform small cyclic delay diversity (SCDD) across two transmitters to achieve spatial diversity, because the configured full coherent precoder may not capture the actual coherency of two non-coherent transmitters. For example, the actual precoder the UE uses for the UL transmission may be [1;x*exp(j*theta*n)], where n is the subcarrier index. However, this scheme may suffer from performance loss when resource block (RB) allocation is small (as in the VoIP example noted above), as the frequency diversity of SCDD may be highly related to bandwidth, which is non ideal for cell-edge UEs with coverage issues (as exp(j*theta*i) does not go through a full cycle if the number of RBs is small).

Aspects of the present disclosure provide a transmission mode that may help achieve full (or higher) power transmission and higher diversity using a multi-part PUSCH. Each PUSCH part may be transmitted using same time domain resources, but different frequency domain resources using a particular PA. In some cases, each PUSCH part may be transmitted using non-overlapped or partially overlapped time domain resources, but different frequency domain resources using a particular PA.

The transmission mode according to certain aspects generally involves at least first and second FDRA parts (FDRAs), which may be derived from a larger overall FDRA. For example, the transmission mode may involve transmitting a first part of PUSCH on a first frequency domain resource allocation (FDRA) using a first transmitter/precoder and transmitting a second part of the PUSCH on a second FDRA using a second transmitter/precoder. While many of the examples described herein involve 2 FDRAs to facilitate understanding, the multi-FDRA concepts may readily be extended to more than 2 FDRAs (e.g., 4 FDRAs or more).

Figure 6A:
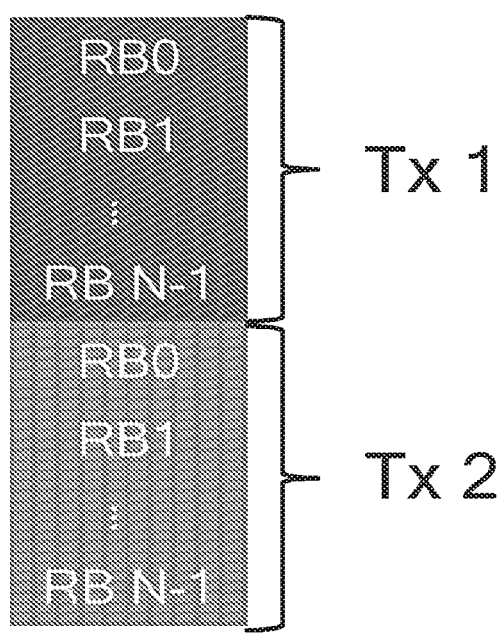
FIGS. 6A and 6B illustrate a diagram illustrating an example of physical uplink shared channel (PUSCH) transmission with multiple frequency domain resource allocation (FDRA) parts, in accordance with certain aspects of the present disclosure.
Figure 6B:
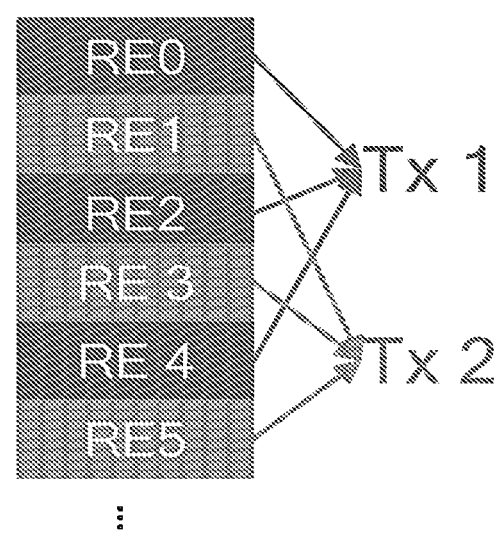

As illustrated in FIGS. 6A and 6B, the precoder on the first FDRA and the precoder on the second FDRA may not have a common Tx antenna (or common PUSCH port). Frequency resources (RBs/REs) of the first FDRA and second FDRA may be localized (as shown in FIG. 6A) or may be interleaved (as shown in FIG. 6B). The time domain resource allocation of the first PUSCH part and second PUSCH part may be the same or different.

The (at least) two precoders (TPMIs) may be configured via DCI for dynamic grants and RRC for configured grants. The two TPMIs may share the same DMRS port (for localized pattern). The two TPMIs may use different DMRS ports for interleaved pattern. Specifically, first TPMI with first FDRA may use DMRS port 0, while second TPMI with second FDRA may use DMRS port 1. For example, for localized FDRAs (as shown in FIG. 6A), PUSCH with non-coherent TPMIs may be sent with TPMI [1; 0] on the first half of FDRA, and TPMI [0; 1] on the second half of FDRA. As an alternative, for interleaved FDRAs, PUSCH with non-coherent TPMIs may be sent with [1; 0] on even REs of FDRA, and with TPMI [0; 1] on odd REs of FDRA. Similarly, for localized FDRAs, PUSCH with partial-coherent TPMIs could be sent with [1; 0; 1; 0] on the first half of FDRA, and with TPMI [0; 1; 0; 1] on second half of FDRA. For interleaved FDRAs, PUSCH with partial-coherent TPMIs could be sent with TPMI [1; 0; 1; 0] on even REs of FDRA, and with TPMI [0; 1; 0; 1] on odd REs of the FDRA.

Example Frequency Hopping for PUSCH Transmissions with Multiple FDRAs

In some cases, frequency hopping may be applied, meaning different frequency resources are used in different transmission occasions (each transmission occasion, the transmitting device hops to a different set of frequency resources). Certain systems (in NR) may support both intra-slot hopping (changing frequency resources within a same slot) as well as inter-slot hopping (changing frequency resources across slot boundaries). Frequency hopping is often applied when transmitting with repetition, so different repetitions of the same data/TB use different frequency resources to achieve frequency diversity.

In some cases, the network may configure a number (e.g., ⅔) of candidate frequency offsets used for hopping via RRC signaling. In such cases, the network may use DCI to indicate one frequency offset $RB_{offset}$ from the (RRC configured) candidate values. For example, at transmission occasion (hop) t=0, the starting RB of PUSCH may be found as:

$$\mod(RB_{start}+\mod(t,2)\cdot RB_{offset}, N_{BWP}^{size}).$$

In some cases, uplink control information (UCI) can be multiplexed with data in a PUSCH transmission. For example, UCI can be transmitted on PUSCH (e.g., aperiodic CSI or semi-persistent CSI) if the PUCCH (on which the UCI would otherwise be transmitted) overlaps with PUSCH.

Aspects of the present disclosure provide techniques for determining frequency hopping and/or UCI multiplexing, for PUSCH transmission sent using multiple FDRA parts.

FIG. 7 is a flow diagram illustrating example operations 700 for wireless communications, in accordance with certain aspects of the present disclosure. The operations 700 may be performed, for example, by a UE (e.g., such as a UE 120 in the wireless communication network 100) to determine frequency hopping for PUSCH repetitions sent with at least two FDRA parts and corresponding precoders.

Operations 700 begin, at 702, by determining at least first and second part frequency domain resource allocations (FDRAs) for a first physical uplink shared channel (PUSCH) transmission occasion. At 704, the UE transmits a transport block (TB) via at least first and second parts of a physical uplink shared channel (PUSCH) on the first and second part FDRAs with first and second precoders during the first PUSCH transmission occasion. At 706, the UE determines at least first and second part FDRAs for a second PUSCH transmission occasion based on a frequency hopping scheme. At 708, the UE transmits the same TB via first and second parts of the PUSCH on the determined first and second part FDRAs with first and second precoders during the second PUSCH transmission occasion.

Figure 8:
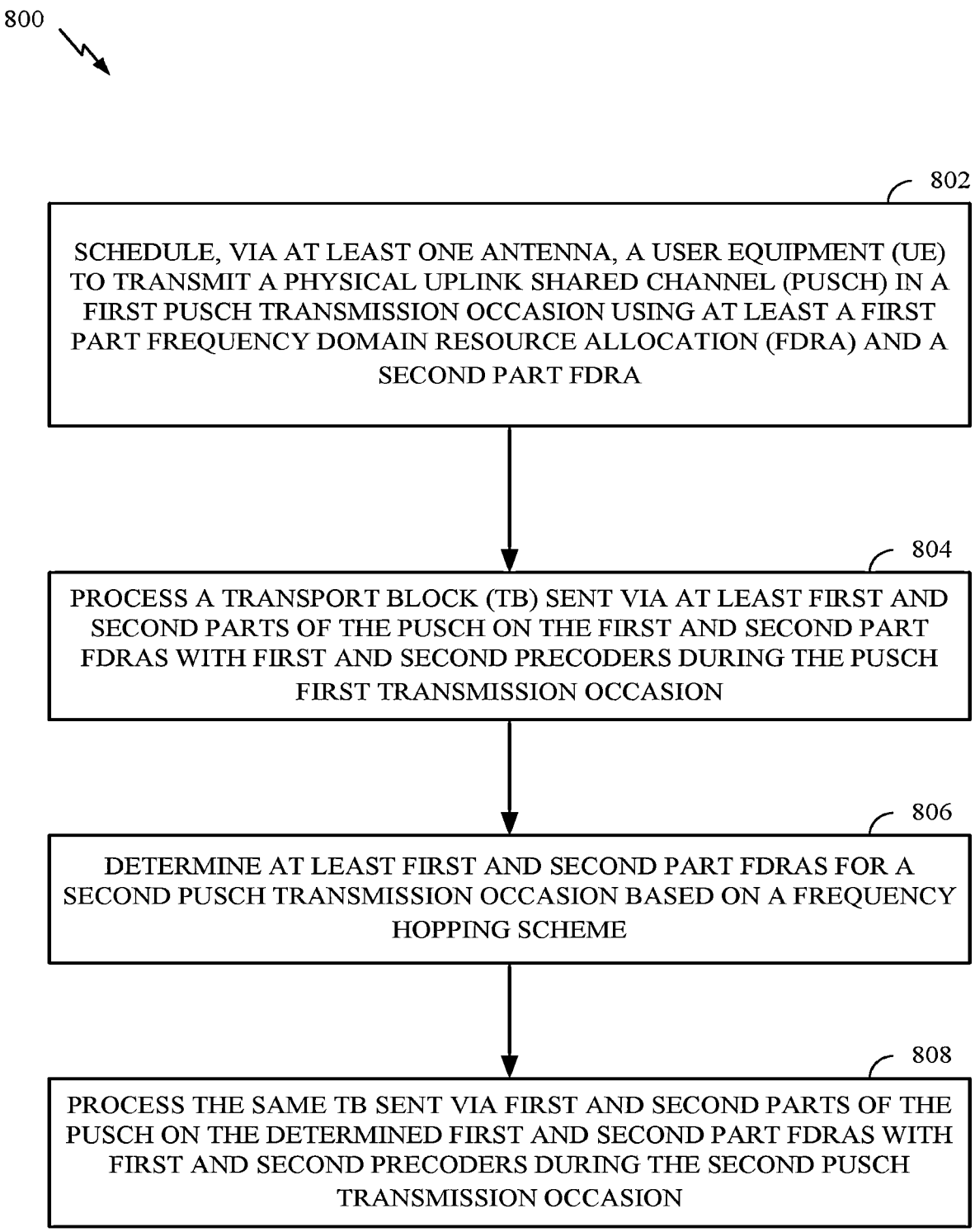
FIG. 8 illustrates example operations that may be performed by a network entity, in accordance with certain aspects of the present disclosure.

FIG. 8 is a flow diagram illustrating example operations 800 for wireless communications that may be considered complementary to operations 700 of FIG. 7. For example, operations 800 may be performed by a network entity (e.g., such as a BS 110 in the wireless communication network 100) to schedule and receive PUSCH repetitions from a UE performing operations 700 of FIG. 7.

Operations 800 begin, at 802, by scheduling, via at least one antenna, a user equipment (UE) to transmit a physical uplink shared channel (PUSCH) in a first PUSCH transmission occasion using at least a first part frequency domain resource allocation (FDRA) and a second part FDRA. At 804, the network entity processes a transport block (TB) sent via at least first and second parts of the PUSCH on the first and second part FDRAs with first and second precoders during the first PUSCH transmission occasion. At 806, the network entity determines at least first and second part FDRAs for a second PUSCH transmission occasion based on a frequency hopping scheme. At 808, the network entity processes the same TB sent via first and second parts of the PUSCH on the determined first and second part FDRAs with first and second precoders during the second PUSCH transmission occasion.

The frequency hopping across different transmission occasions may be determined according to various options.

Figure 9A:
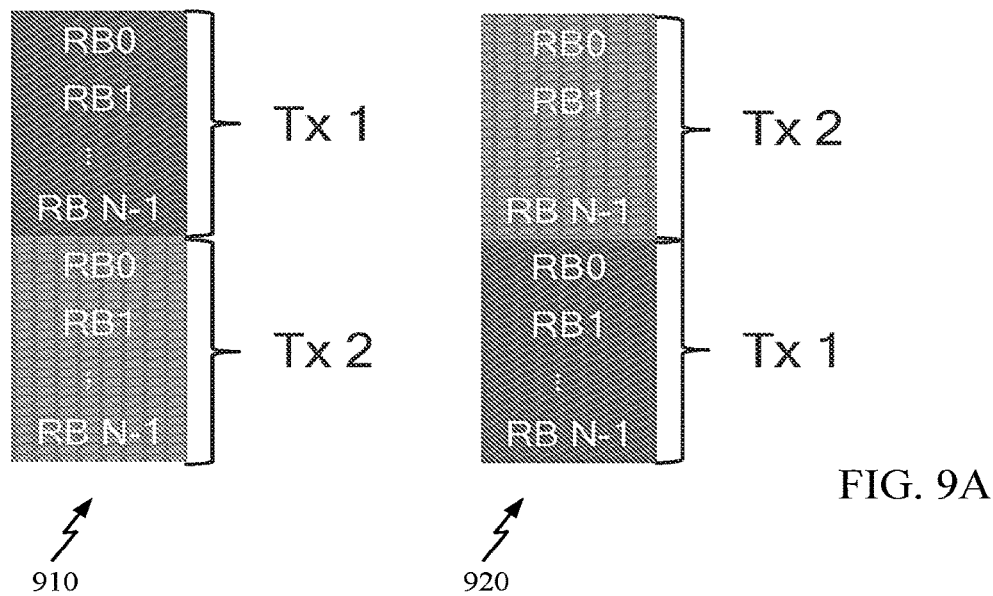
FIGS. 9A-9C illustrate examples of frequency hopping determination, in accordance with certain aspects of the present disclosure.

According to a first option, the frequency hopping may be determined by swapping the frequency resources (FDRA parts) used by the different transmitters. For example, as shown in FIG. 9A, the frequency resources used for Tx 1 in a first PUSCH transmission occasion 910 may be used for Tx 2 in a second PUSCH transmission occasion 920, while the frequency resources used for Tx 2 in the first PUSCH transmission occasion 910 may be used for Tx 1 in the second PUSCH transmission occasion 920.

This option may be generalized as follows. If there are N Tx/precoders, at transmission occasion (hop) t=0, the starting RB of the n-th Tx/precoder may be found as:

$$\mod(RB_{start}+n\cdot RB_{offset,tx}, N_{BWP}^{size}),$$

then at transmission occasion (hop) t=1, the starting RB of n-th Tx/precoder is hopped to the starting RB of next Tx/precoder, for example, mod(n+1, N). In other words, the starting RB of n-th Tx/precoder at hop t=1 may be found as:

$$\mod(RB_{start}+n\cdot RB_{offset,tx}, N_{BWP}^{size}),$$

More generally, the starting RB of n-th Tx/precoder at hop t may be found as:

$$\mod(RB_{start}+\mod(n+1,N)\cdot RB_{offset,tx}, N_{BWP}^{size}).$$

Figure 9B:
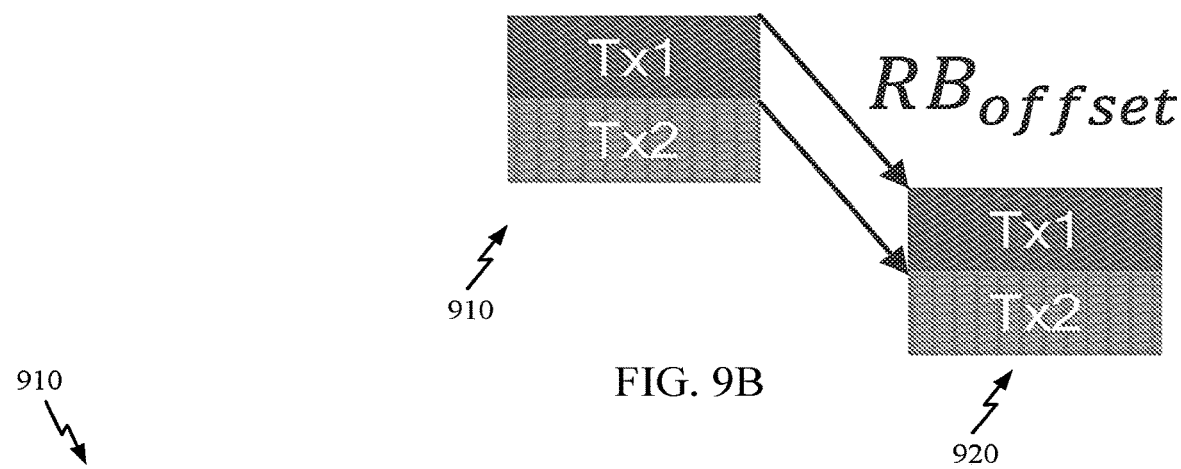

According to a second option, each Tx/precoder may share a common frequency hopping offset ($RB_{offset}$). As illustrated in FIG. 9B, in this case, the frequency resources for each Tx/precoder in the second PUSCH transmission occasion 920 are determined based on the frequency resources used in the first PUSCH transmission occasion 910 and the common frequency hopping offset.

This second option may be generalized as follows. If there are N Tx/precoders, at transmission occasion (hop) t=0, the starting RB of n-th Tx/precoder may be found as:

$$\mod(RB_{start}+n\cdot RB_{offset,tx}, N_{BWP}^{size}),$$

then at transmission occasion (hop) t=1, the starting RB of n-th Tx/precoder is hopped to:

$$\mod(RB_{start}+n\cdot RB_{offset,tx}+RB_{offset}, N_{BWP}^{size}).$$

More generally, the starting RB of n-th Tx/precoder at hop t may be found as:

$$\mod(RB_{start}+n\cdot RB_{offset,tx}+t\cdot RB_{offset}, N_{BWP}^{size}).$$

Figure 9C:
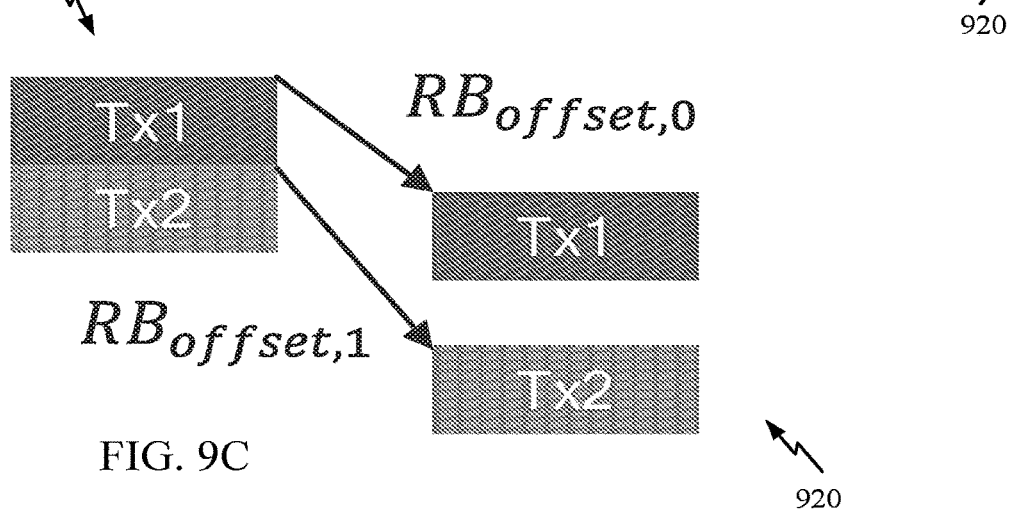

According to a third option, transmitter specific frequency hopping may be used. For example, each Tx/precoder n may have its own associated (Tx-specific) hopping offset, $RB_{offset,n}$. As illustrated in FIG. 9C, in this case, the frequency resources for each Tx/precoder in the second PUSCH transmission occasion 920 are determined based on the frequency resources used in the first PUSCH transmission occasion 910 and the Tx-specific frequency hopping offset ($RB_{offset,0}$ or $RB_{offset,1}$).

According to this option, if there are N Tx/precoders, at transmission occasion (hop) t=0, the starting RB of n-th Tx/precoder may be found as:

$$\mod(RB_{start}+n\cdot RB_{offset,tx}, N_{BWP}^{size}),$$

then at transmission occasion (hop) t=1, the starting RB of n-th Tx/precoder is hopped to:

$$\mod(RB_{start}+n\cdot RB_{offset,tx}+RB_{offset,n}, N_{BWP}^{size}).$$

More generally, the starting RB of n-th Tx/precoder at hop t may be found as:

$$\mathrm{mod}(RB_{start}+n \cdot RB_{offset,tx}+t \cdot RB_{offset,n}, N_{BWP}^{size}).$$

According to certain aspects, the Tx-specific RB offset $RB_{offset,n}$ for each Tx/precoder may be configured via DCI, MACCE or RRC. In some cases, the values for $RB_{offset,n}$ may be determined, for example, based on antenna index n, and/or various other parameters.

In some cases, certain enhancements for demodulation reference signal (DMRS) and phase tracking reference signals (PTRS) may be achieved. As an example, if a PTRS port 0 is associated with PUSCH port 1000 and 1002, PTRS port 1 may be associated with PUSCH port 1001 and 1003. For non-coherent and partial coherent Tx, port 1000/1002 may not be jointly used with port 1001/1003.

In some cases, the actual association between DMRS and PUSCH may be based on the configured TPMI. The association between DMRS and PTRS may also be based on the configured TPMI. The following are examples of such associations (or mappings):

TPMI [1; 0; 0; 0] maps DMRS 0 to PUSCH 1000, so PTRS 0 is associated with DMRS 0;
TPMI [1; 0; 1; 0] maps DMRS 0 to PUSCH 1000 and 1002, so PTRS 0 is associated with DMRS 0;
TPMI [0; 1; 0; 0] maps DMRS 0 to PUSCH 1000, so PTRS 1 is associated with DMRS 0; and
TPMI [0; 1; 0; 1] maps DMRS 0 to PUSCH 1000 and 1002, so PTRS 1 is associated with DMRS 0.

If there are multiple DMRS associated with one PTRS, the PTRS may be associated to one DMRS based on configuration. For example, considering an example of a rank-2 transmission with TPMI [1; 0; 0; 0] that maps DMRS 0 to PUSCH 1000, and TPMI [0; 0; 1; 0] that maps DMRS 1 to PUSCH 1002, both DMRS0 and DMRS1 are associated with PTRS 0, while the network may configure only DMRS0 associated with PTRS 0.

In certain applications, such as space orthogonal-resource transmit diversity (SORTD), a single DMRS port may be associated with two TPMIs. In such cases, if two TPMIs are associated with PUSCH 1000/1002 and PUSCH 1001/1003, there are two PTRS associated with the DMRS on different FDRAs. For example, TPMI [1; 0] (i.e., indicating Tx0, PUSCH port 1000) and TPMI [0; 1] (i.e., indicating Tx1, PUSCH port 1001) are used. In such cases, PTRS 0 may be used for the FDRA of TPMI [1; 0], while PTRS 1 is used for the FDRA of TPMI [0; 1]. In this case, a single DMRS port 0 may be used if the FDRA allocation is the localized pattern, i.e., in the first part of the FDRA, DMRS port0 is associated with TPMI [1; 0] while in the second part of the FDRA, DMRS port 1 is associated with TPMI [0; 1].

In some cases, uplink control information (UCI) may be multiplexed (with data) in a multi-FDRA PUSCH transmission. According to one option, if there is UCI overlapped with a SORTD PUSCH, the UCI may be multiplexed with one (a single) part of PUSCH (e.g., transmitted on one of the FDRA parts). In such cases, the single part may be the first part, the last part, the part with largest FDRA, or the part with the smallest FDRA. According to another option, if there is UCI overlapped with the SORTD PUSCH, the UCI may be repeatedly multiplexed with multiple (or all) parts of PUSCH (on multiple/all FDRA parts).

A transmission mode using of multiple FDRA parts, as provided herein may help enhance the performance for UEs at a cell-edge, for example, by allowing for full power transmission using relatively low cost power amplifiers (PAs). The transmission mode may also help achieve frequency diversity, increasing the number of resource blocks (RBs) used for the PUSCH transmissions. The techniques presented herein may also.

Figure 10:
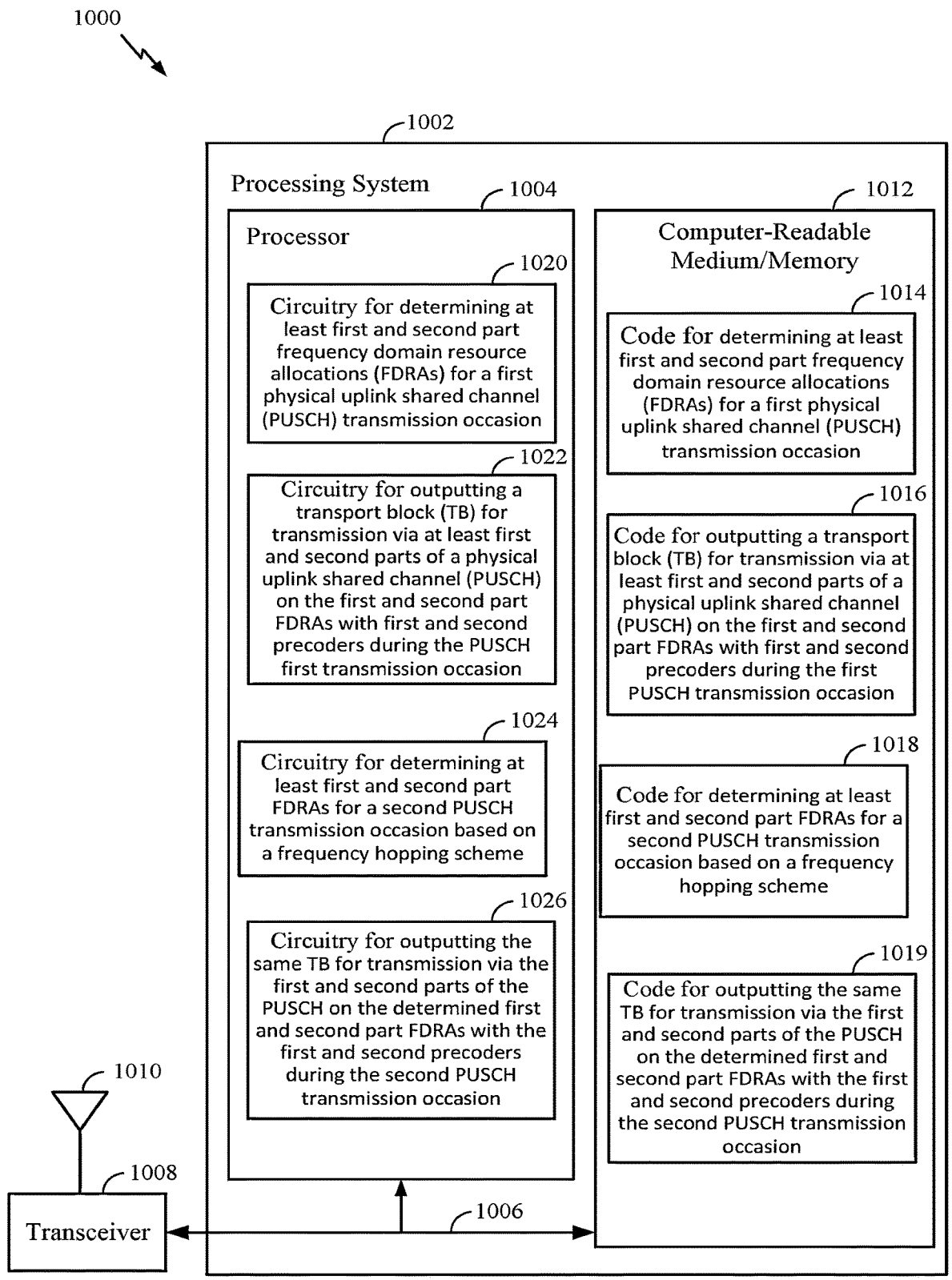
FIG. 10 illustrates an apparatus with example components capable of performing operations, in accordance with certain aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7. In certain aspects, computer-readable medium/memory 1012 stores code 1014 for determining at least first and second part frequency domain resource allocations (FDRAs) for a first physical uplink shared channel (PUSCH) transmission occasion; code 1016 for transmitting a transport block (TB) via at least first and second parts of a physical uplink shared channel (PUSCH) on the first and second part FDRAs with first and second precoders during the first PUSCH transmission occasion; code 1018 for determining at least first and second part FDRAs for a second PUSCH transmission occasion based on a frequency hopping scheme; and code 1019 for transmitting the same TB via first and second parts of the PUSCH on the determined first and second part FDRAs with first and second precoders during the second PUSCH transmission occasion. In certain aspects, the processor 1004 has circuitry configured to implement the code stored in the computer-readable medium/memory 1012. The processor 1004 includes circuitry 1020 for determining at least first and second part frequency domain resource allocations (FDRAs) for a first physical uplink shared channel (PUSCH) transmission occasion; circuitry 1022 for outputting a transport block (TB) for transmission via at least first and second parts of a physical uplink shared channel (PUSCH) on the first and second part FDRAs with first and second precoders during the first PUSCH transmission occasion; circuitry 1024 for determining at least first and second part FDRAs for a second PUSCH transmission occasion based on a frequency hopping scheme; and circuitry 1026 for outputting the same TB for transmission via first and second parts of the PUSCH on the determined first and second part FDRAs with first and second precoders during the second PUSCH transmission occasion.

Figure 11:
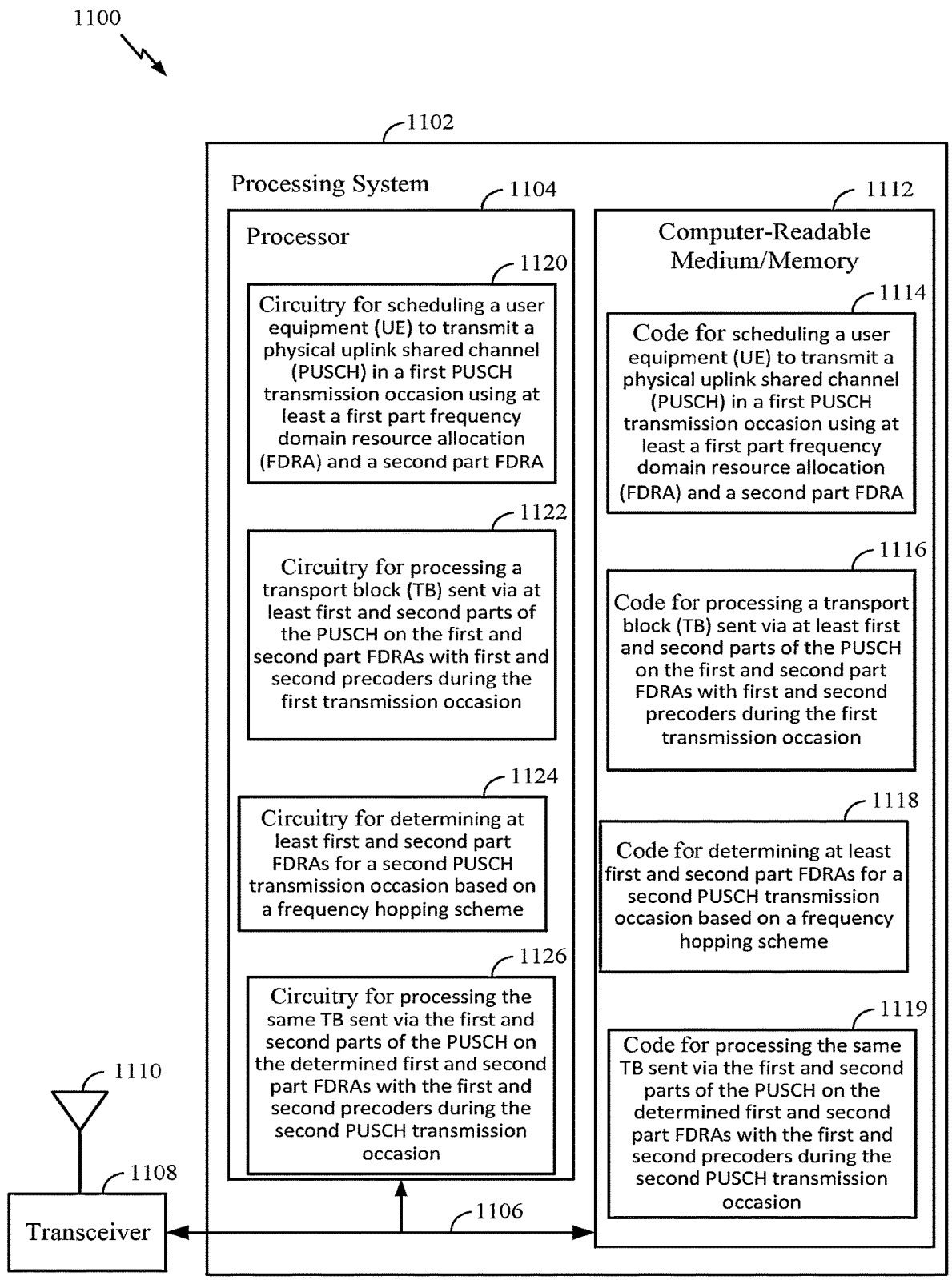
FIG. 11 illustrates an apparatus with example components capable of performing operations, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8. In certain aspects, computer-readable medium/memory 1112 stores code 1114 for scheduling a user equipment (UE) to transmit a physical uplink shared channel (PUSCH) in a first PUSCH transmission occasion using at least a first part frequency domain resource allocation (FDRA) and a second part FDRA; code 1116 for processing a transport block (TB) sent via at least first and second parts of the PUSCH on the first and second part FDRAs with first and second precoders during the first PUSCH transmission occasion; code 1118 for determining at least first and second part FDRAs for a second PUSCH transmission occasion based on a frequency hopping scheme; and code 1119 for processing the same TB sent via first and second parts of the PUSCH on the determined first and second part FDRAs with first and second precoders during the second PUSCH transmission occasion. In certain aspects, the processor 1104 has circuitry configured to implement the code stored in the computer-readable medium/memory 1112. The processor 1104 includes circuitry 1120 for scheduling a user equipment (UE) to transmit a physical uplink shared channel (PUSCH) in a first PUSCH transmission occasion using at least a first part frequency domain resource allocation (FDRA) and a second part FDRA; circuitry 1122 for processing a transport block (TB) sent via at least first and second parts of the PUSCH on the first and second part FDRAs with first and second precoders during the first PUSCH transmission occasion; circuitry 1124 for determining at least first and second part FDRAs for a second PUSCH transmission occasion based on a frequency hopping scheme; and circuitry 1126 for processing the same TB sent via first and second parts of the PUSCH on the determined first and second part FDRAs with first and second precoders during the second PUSCH transmission occasion.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 458, 464 and 466, and/or controller/processor 480 of the UE 120 and/or processors 420, 430, 438, and/or controller/processor 440 of the BS 110 shown in FIG. 4 may be configured to perform operations 700 of FIG. 7 and operations 800 of FIG. 8.

Means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for determining, means for scheduling, and means for processing may include a processing system, which may include one or more processors, such as processors 458, 464 and 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7, and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and technique s described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A user equipment (UE), comprising:
a processing system configured to determine at least first and second part frequency domain resource allocations (FDRAs) for a first physical uplink shared channel (PUSCH) transmission occasion; and
a transmitter configured to transmit a transport block (TB) via at least first and second parts of a physical uplink shared channel (PUSCH) on the first and second part FDRAs with first and second precoders during the first PUSCH transmission occasion, wherein:
the processing system is further configured to determine at least first and second part FDRAs for a second PUSCH transmission occasion based on a frequency hopping scheme; and
the transmitter is further configured to transmit the same TB via the first and second parts of the PUSCH on the determined first and second part FDRAs with the first and second precoders during the second PUSCH transmission occasion.

2. The UE of claim 1, wherein, during each of the first and second PUSCH transmission occasion:
the first PUSCH part is sent on the first part FDRA using a first precoder; and
the second PUSCH part is sent on the second part FDRA using a second precoder.

3. The UE of claim 2, wherein the first and second precoders do not have a common transmit antenna or PUSCH port.

4. The UE of claim 1, wherein the frequency hopping scheme dictates that:
the FDRA associated with each of the first and second precoder at a second PUSCH transmission occasion is obtained by swapping the FDRA associated with the second and first precoder, respectively, at the first PUSCH transmission occasion.

5. The UE of claim 1, wherein:
the FDRA associated with the first precoder for the second PUSCH transmission occasion is shifted in frequency relative to the FDRA associated with the first precoder for the second PUSCH transmission occasion;
in a PUSCH transmission occasion t, the PUSCH is sent via N precoders; and
a starting resource block (RB) of an n-th precoder at the PUSCH transmission occasion t is mod ($RB_{start}$+mod (n+t, N)·$RB_{offset,tx}$, $N_{BWP}^{SIZE}$).

6. The UE of claim 1, wherein the frequency hopping scheme dictates that:
the first part FDRA for the second PUSCH transmission occasion is determined based on frequency resources for the first part FDRA for the first PUSCH transmission occasion and a frequency hopping offset; and
the second part FDRA for the second PUSCH transmission occasion is determined based on frequency resources for the second part FDRA for the first PUSCH transmission occasion and the same frequency hopping offset.

7. The UE of claim 6, further comprising a receiver configured to:
receive radio resource control (RRC) signaling configuring the UE with a list of candidate values for the frequency hopping offset; and
receive at least one of a downlink control information (DCI) or a medium access control (MAC) control element activating one of the candidate values for the frequency hopping offset.

8. The UE of claim 6, wherein:
in a PUSCH transmission occasion t, the PUSCH is sent via N precoders; and
a starting resource block (RB) of an n-th precoder at the PUSCH transmission occasion t is mod ($RB_{start}$+n·$RB_{offset}$+t·$RB_{offset}$, $N_{BWP}^{size}$), where $RB_{offset}$ is the frequency hopping offset.

9. The UE of claim 1, wherein the frequency hopping scheme dictates that:
the first part FDRA for the second PUSCH transmission occasion is determined based on frequency resources for the first part FDRA for the first PUSCH transmission occasion and a first frequency hopping offset; and
the second part FDRA for the second PUSCH transmission occasion is determined based on frequency resources for the second part FDRA for the first PUSCH transmission occasion and a second frequency hopping offset.

10. The UE of claim 9, wherein:
in a PUSCH transmission occasion t, the PUSCH is sent via N precoders; and
a starting resource block (RB) of an n-th precoder at the PUSCH transmission occasion t is mod ($RB_{start}$+n·$RB_{offset,n}$+t·$RB_{offset,n}$, $N_{BWP}^{size}$), where $RB_{offset,n}$ is a frequency hopping offset for the precoder n.

11. The UE of claim 10, further comprising a receiver configured to:
receive radio resource control (RRC) signaling configuring the UE with a list of candidate values for the frequency hopping offset for each precoder n; and
receive at least one of a downlink control information (DCI) or a medium access control (MAC) control element activating one of the candidate values for the frequency hopping offset for each precoder n.

12. A network entity, comprising:
a processing system configured to:
schedule, via at least one antenna, a user equipment (UE) to transmit a physical uplink shared channel (PUSCH) in a first PUSCH transmission occasion using at least a first part frequency domain resource allocation (FDRA) and a second part FDRA;
process a transport block (TB) sent via at least first and second parts of the PUSCH on the first and second part FDRAs with first and second precoders during the first PUSCH transmission occasion;
determine at least first and second part FDRAs for a second PUSCH transmission occasion based on a frequency hopping scheme; and
process the same TB sent via the first and second parts of the PUSCH on the determined first and second part FDRAs with the first and second precoders during the second PUSCH transmission occasion.

13. The network entity of claim 12, wherein, during each of the first and second PUSCH transmission occasion:
the first PUSCH part is sent on the first part FDRA using the first precoder; and
the second PUSCH part is sent on the second part FDRA using the second precoder.

14. The network entity of claim 12, wherein the first and second precoders do not have a common transmit antenna or PUSCH port.

15. The network entity of claim 12, wherein the frequency hopping scheme dictates that:
the FDRA associated with each of the first and second precoder at a second PUSCH transmission occasion is obtained by swapping the FDRA associated with the second and first precoder, respectively, at the first PUSCH transmission occasion.

16. The network entity of claim 12, wherein:
the FDRA associated with the first precoder for the second PUSCH transmission occasion is shifted in frequency relative to the FDRA associated with the first precoder for the second PUSCH transmission occasion;
in a PUSCH transmission occasion t, the PUSCH is sent via N precoders; and
a starting resource block (RB) of an n-th precoder at the PUSCH transmission occasion t is mod ($RB_{start}$+mod (n+t, N)·$RB_{offset,tx}$, $N_{BWP}^{size}$).

17. The network entity of claim 12, wherein the frequency hopping scheme dictates that:
the first part FDRA for the second PUSCH transmission occasion is determined based on frequency resources for the first part FORA for the first PUSCH transmission occasion and a frequency hopping offset; and
the second part FDRA for the second PUSCH transmission occasion is determined based on frequency resources for the second part FORA for the first PUSCH transmission occasion and the same frequency hopping offset.

18. The network entity of claim 17, further comprising a receiver configured to:
receive radio resource control (RRC) signaling configuring the UE with a list of candidate values for the frequency hopping offset; and
receive at least one of a downlink control information (DCI) or a medium access control (MAC) control element activating one of the candidate values for the frequency hopping offset.

19. The network entity of claim 17, wherein:
in a PUSCH transmission occasion t, the PUSCH is sent via N precoders; and
a starting resource block (RB) of an n-th precoder at the PUSCH transmission occasion t is mod ($RB_{start}$+ n·$RB_{offset}$+t·$RB_{offset}$, $N_{BWP}^{size}$), where $RB_{offset}$ is the frequency hopping offset.

20. The network entity of claim 12, wherein the frequency hopping scheme dictates that:
the first part FDRA for the second PUSCH transmission occasion is determined based on frequency resources for the first part FORA for the first PUSCH transmission occasion and a first frequency hopping offset; and
the second part FDRA for the second PUSCH transmission occasion is determined based on frequency resources for the second part FDRA for the first PUSCH transmission occasion and a second frequency hopping offset.

21. The network entity of claim 20, wherein:
in a PUSCH transmission occasion t, the PUSCH is sent via N precoders; and
a starting resource block (RB) of an n-th precoder at the PUSCH transmission occasion t is mod ($RB_{start}$+ n·$RB_{offset,tx}$+t·$RB_{offset,n}$, $N_{BWP}^{size}$), where $RB_{offset,n}$ is a frequency hopping offset for the precoder n.

22. The network entity of claim 21, further comprising a receiver configured to:
receive radio resource control (RRC) signaling configuring the UE with a list of candidate values for the frequency hopping offset for each precoder n; and
receive at least one of a downlink control information (DCI) or a medium access control (MAC) control element activating one of the candidate values for the frequency hopping offset for each precoder n.

* * * * *